US008005942B2

United States Patent
Yoshiuchi et al.

(10) Patent No.: US 8,005,942 B2
(45) Date of Patent: Aug. 23, 2011

(54) INTEGRATED PRESENCE MANAGEMENT SYSTEM, PRESENCE SERVER AND PRESENCE INFORMATION MANAGEMENT PROGRAM

(75) Inventors: Hideya Yoshiuchi, Kokubunji (JP); Satoshi Kawachi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1195 days.

(21) Appl. No.: 11/179,529

(22) Filed: Jul. 13, 2005

(65) Prior Publication Data
US 2006/0167998 A1    Jul. 27, 2006

(30) Foreign Application Priority Data
Dec. 17, 2004    (JP) ................. 2004-365254

(51) Int. Cl.
G06F 15/173    (2006.01)
(52) U.S. Cl. ........................ 709/224; 709/223
(58) Field of Classification Search .............. 709/224
See application file for complete search history.

(56) References Cited

U.S. PATENT DOCUMENTS

| 6,721,412 | B1 * | 4/2004 | Youngs | 379/204.01 |
| 7,035,923 | B1 * | 4/2006 | Yoakum et al. | 709/224 |
| 2004/0122901 | A1 * | 6/2004 | Sylvain | 709/206 |
| 2005/0113123 | A1 * | 5/2005 | Torvinen | 455/519 |
| 2005/0278294 | A1 * | 12/2005 | Beartusk et al. | 707/1 |
| 2008/0315990 | A1 * | 12/2008 | Komatsu | 340/5.81 |

FOREIGN PATENT DOCUMENTS

| JP | 2000-278411 | 3/1999 |
| JP | 2004-070752 | 8/2002 |
| JP | 2004-072485 | 8/2002 |

* cited by examiner

*Primary Examiner* — Jeffrey Pwu
*Assistant Examiner* — Shripal K Khajuria
(74) *Attorney, Agent, or Firm* — Hitachi America, Ltd.

(57) ABSTRACT

To group plural applications and integrally manage their presence information. A presence server includes plural clients that receive services from application servers providing plural services, and a presence information that manages presence information of applications and group information. The presence server receives presence information registration from the application clients, updates presence information of all applications having the same group ID as that of an application of presence information registration source in an application type registration table according to the content of registered presence information, and reflects its result in a presence information table.

6 Claims, 20 Drawing Sheets

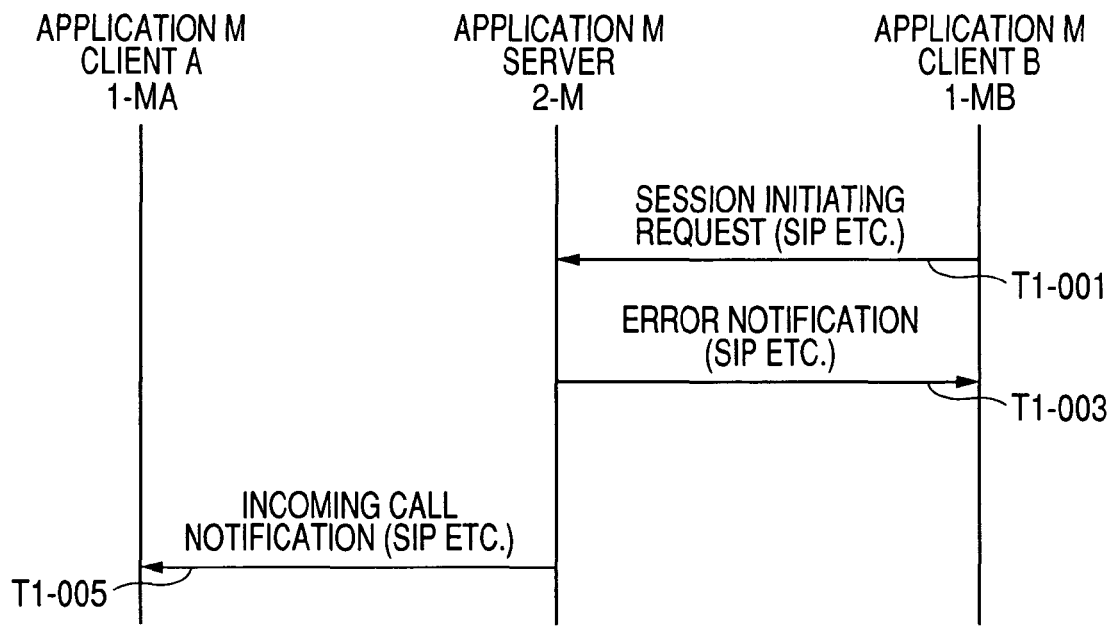
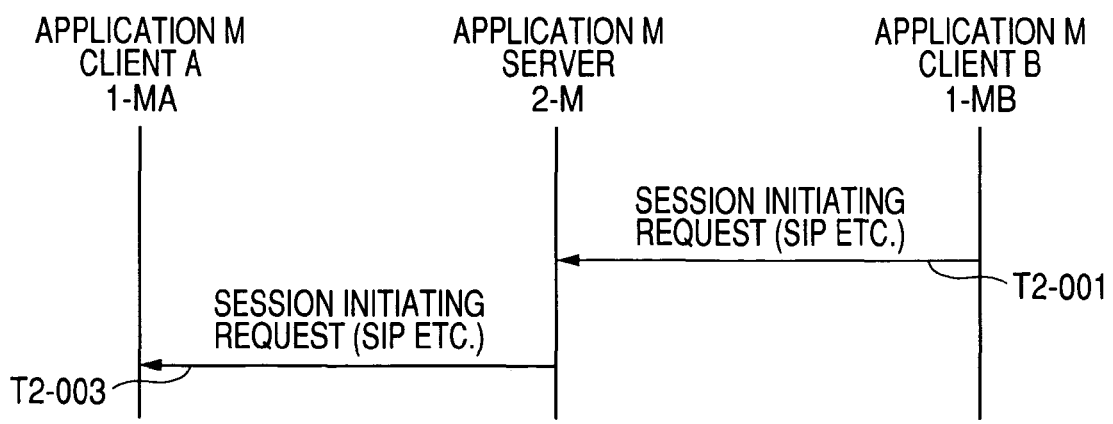

FIG. 23
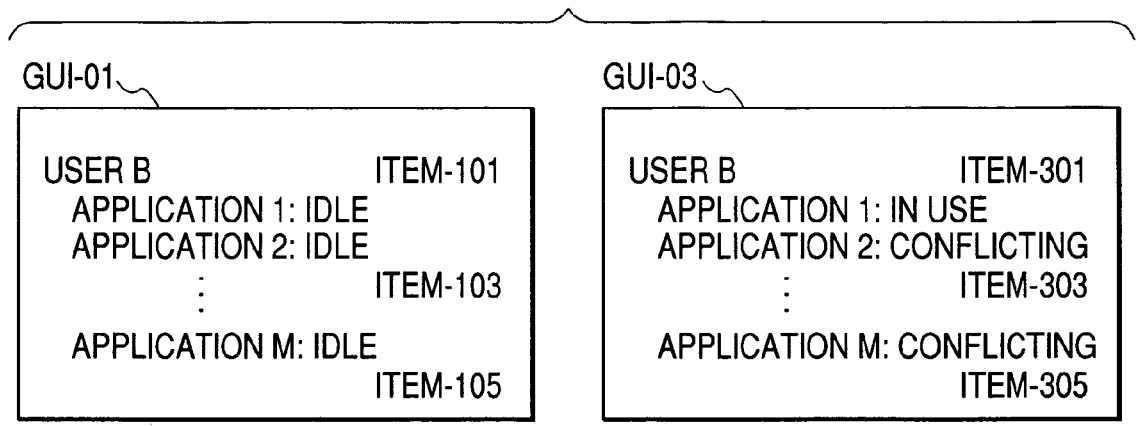
FIG. 24
GUI-05
ITEM-501
GROUP NAME: [    ]
☐ APPLICATION 1  ITEM-503
☐ APPLICATION 2  ITEM-505
⋮                ITEM-509
☐ APPLICATION M  ITEM-507  [REGISTRATION]
FIG. 25
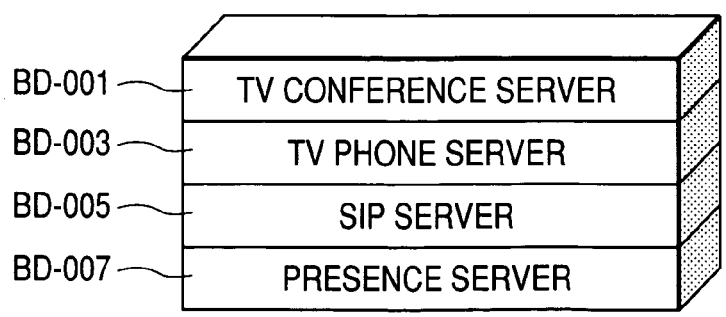

INTEGRATED PRESENCE MANAGEMENT SYSTEM, PRESENCE SERVER AND PRESENCE INFORMATION MANAGEMENT PROGRAM

CLAIM OF PRIORITY

The present application claims priority from Japanese application JP 2004-365254 filed on Dec. 17, 2004, the content of which is hereby incorporated by reference into this application.

FIELD OF THE INVENTION

The present invention relates to a system that integrally manages presence information of plural applications.

BACKGROUND OF THE INVENTION

The presence server manages the application types that individuals can use and their use state as presence information (e.g., JP-A Nos. 72485/2004 and 70752/2004). Communication means available to users have diversified and it has become possible for one user to use plural application at the same time. To cope with such a situation, users' presence information includes three elements: (1) user name, (2) the type of application used by user, and (3) states of individual applications.

Individual applications operate independently, and when a user activates an application, the user registers the state of the application as "idle" in a presence server. Many of the application with presence information establish a session with a communication party, and perform data transmitting/receiving within the session. The state of being in communication exists in the applications, and the state of the applications is registered as "in communication" when the session is established. One user does not communicate at the same time with plural counter parties, and a session is always established with a one-to-one relationship with the user. When the user is in communication with a specific counter party, it does not establish a session with another user. Therefore, if the user acquires presence information of a counter party that is usable, the user establishes a session to perform communications. However, if the presence information of the counter party indicates "in communication", the user waits until the communication of the counter party terminates.

SUMMARY OF THE INVENTION

However, some combinations of applications cannot be used at the same time because of constraints of devices, resources, and the like. Therefore, in some cases, applications cannot be used though they are not in communication. For example, consider the case where TV phone is usable with a one-to-one relationship with TV conference in which many users participate. Since any of the two applications uses two devices camera and microphone, TV conference, and the TV phone cannot be used at the same time. When TV conference is in use, the presence information of TV conference is set to "in communication". However, at this time, it seems to other users that a relevant user is in communication in TV conference, and TV phone is usable. Actually, since TV conference and the TV phone cannot be used at the same time, an attempt to communicate with the user over TV phone would result in an error. Thus, because of mismatch between presence information and actual states of users, there occurs a problem that applications appearing to be usable cannot be used.

The above-mentioned problem occurs because presence information is individually managed without taking constraints between applications into account. With JP-A No. 72485/2004, although plural pieces of presence information are collectively sent to a user, the patent cannot solve the above-mentioned problem because constraints between applications are not taken into account. With JP-A No. 70752/2004, although a terminal having plural communication media manages the media by logical numbers and provides an alternative media when a certain media is in communication, the patent has the same problem as the patent of JP-A No. 72485/2004 in that constraints between logical numbers are not taken into account. Also, there is a problem that communication using an undesired media may be performed for other users not wishing communication over the alternative media.

The present invention has been made in view of the above circumstances, and an object of the present invention is to group applications that cannot be used at the same time because of constraints such as conflict of devices and resources to integrally manage presence information of applications of the same groups.

The present invention includes plural application servers that provide services, plural application clients that receive services from the application servers, and a presence server that integrally manages presence information of applications belonging to same groups by a presence information DB for grouping and managing presence information of the application clients, wherein the presence servers receive presence information registration from the application clients, and updates presence information of all application clients belonging to the same group as that of a presence information sending source according to sent present information, thereby synchronizing presence information of application clients within the group.

Accordingly, when presence information of a specific application is updated, the present invention also updates presence information of applications belonging to the same group as that of the application, thereby making it possible to notify other users of the states of all applications within the group.

BRIEF DESCRIPTION OF THE DRAWINGS

FIG. 8 is a sequence diagram showing an embodiment of a processing method of a session start request;

FIG. 9 is a sequence diagram showing another embodiment of a processing method of a session start request;

FIG. 23 is GUI of presence information notification;

FIG. 24 is GUI of group registration; and

FIG. 25 is a drawing showing system building by a blade server.

DETAILED DESCRIPTION OF THE PREFERRED EMBODIMENTS

Hereinafter, preferred embodiments of the present invention will be described with reference to the accompanying drawings.

First Embodiment

Figure 1:
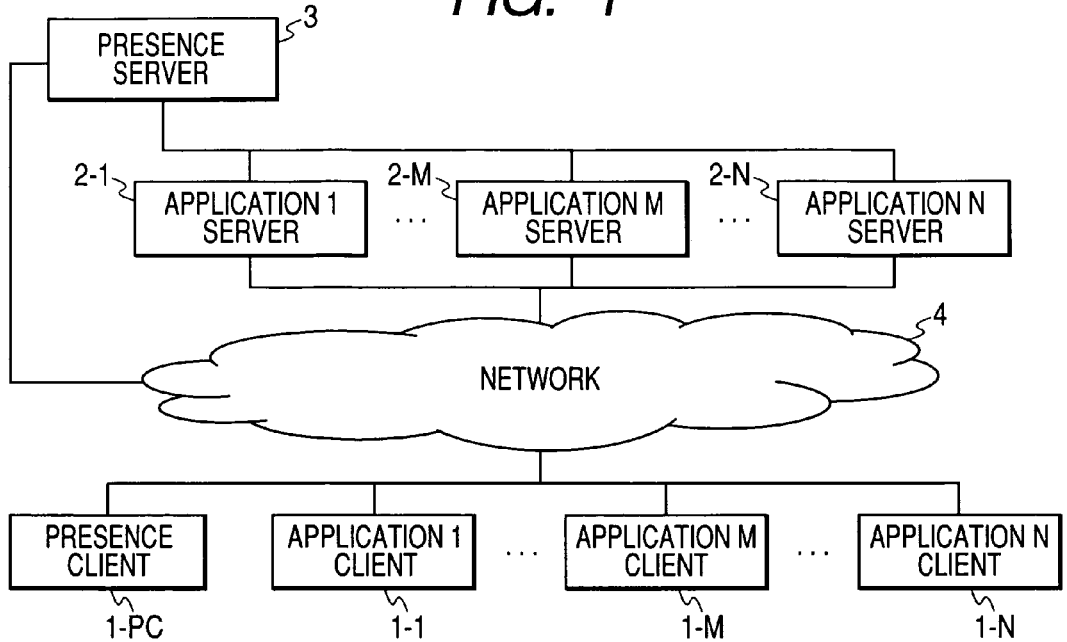
FIG. 1 is a system configuration diagram of an integrated presence management system.

FIG. 1 is a system configuration diagram. The system includes application clients 1-1 to 1-M to 1-N for providing various services to users, a presence client 1-PC, application servers 2-1 to 2-M to 2-N corresponding to the application clients, and a presence server 3 managing users' presence information. These devices are connected with each other through a network 4. However, the configuration of the system is not limited to the above-mentioned configuration as long as effects of the present invention are obtained.

Figure 2:
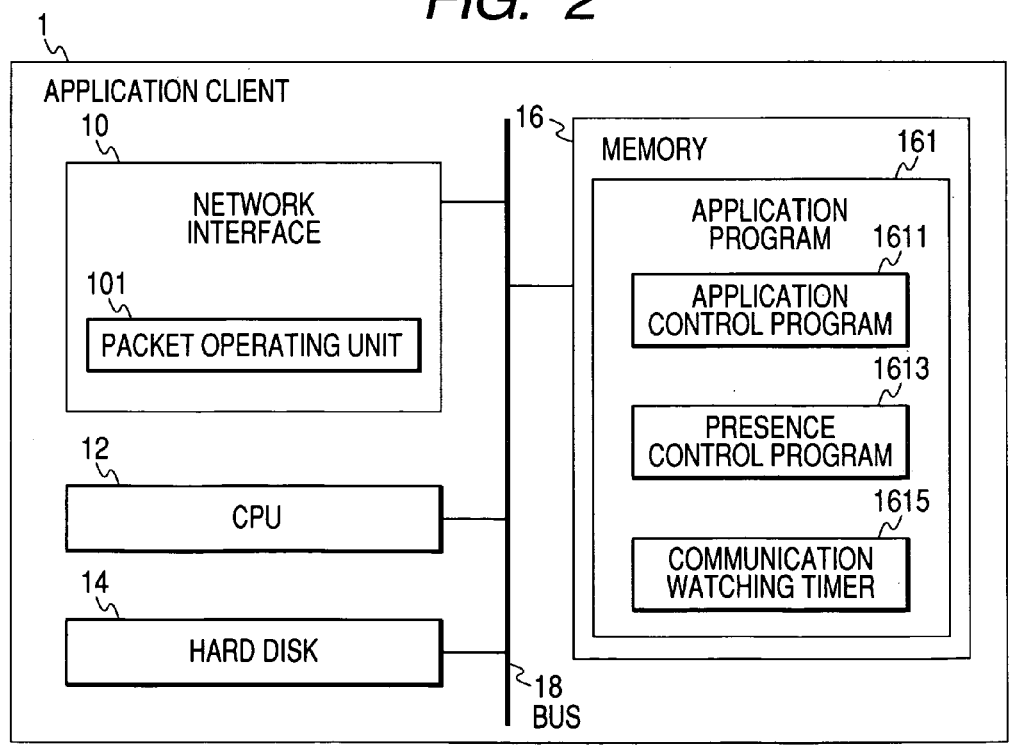
FIG. 2 is a device configuration drawing of an application client.

FIG. 2 is a device configuration drawing of the application client 1. The application client 1 has a basic hardware configuration including a network interface 10, a CPU 12, a hard disk 14, a memory 16, and a bus 18, and communicates with the network 4 through a packet operating unit 101 on the network interface 10. An application program 161 for providing services such as TV phones and multi-point TV conferences to users is placed on the memory 16. The application program 161 includes an application control program 1611 that controls various services, a presence control program 1613 for registering the use state of applications as presence information, and a communication watching timer program 1615 that watches communication states, and performs time-out processing as required. However, the device configuration of the application client 1 is not limited to the above-mentioned configuration as long as effects of the present invention are obtained.

Figure 19:
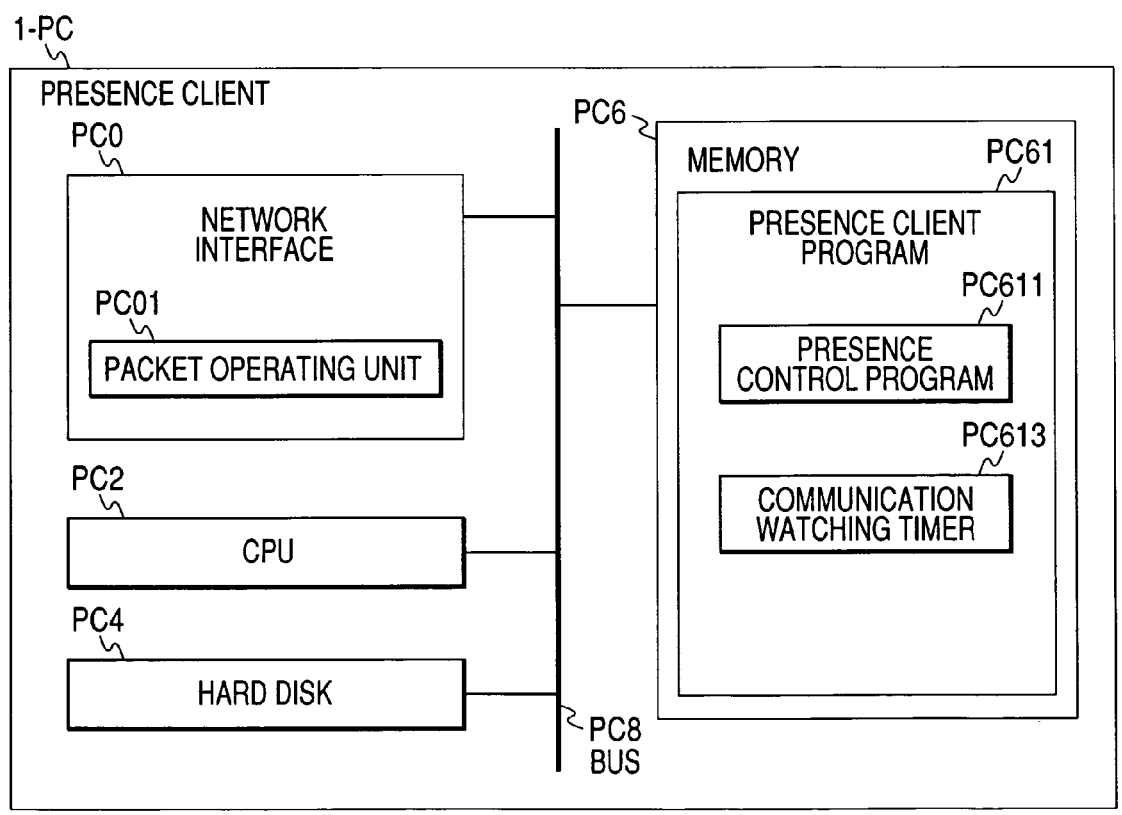
FIG. 19 is a device configuration drawing of a presence client.

FIG. 19 is a device configuration drawing of the presence client 1-PC. The presence client 1-PC has a basic hardware configuration including a network interface PC0, a CPU (PC2), a hard disk PC4, a memory PC6, and a bus PC8, and communicates with the network 4 through a packet operating unit PC01 on the network interface PC0. A presence client program PC61 for processing presence information is placed on the memory PC 6. The presence client program PC61 includes a presence control program PC611 that performs control such as the notification, registration, and the like of presence information, and a communication watching timer program PC613 that watches communication states and performs time-out processing as required. However, the device configuration of the presence client 1-PC is not limited to the above-mentioned configuration as long as effects of the present invention are obtained.

Figure 3:
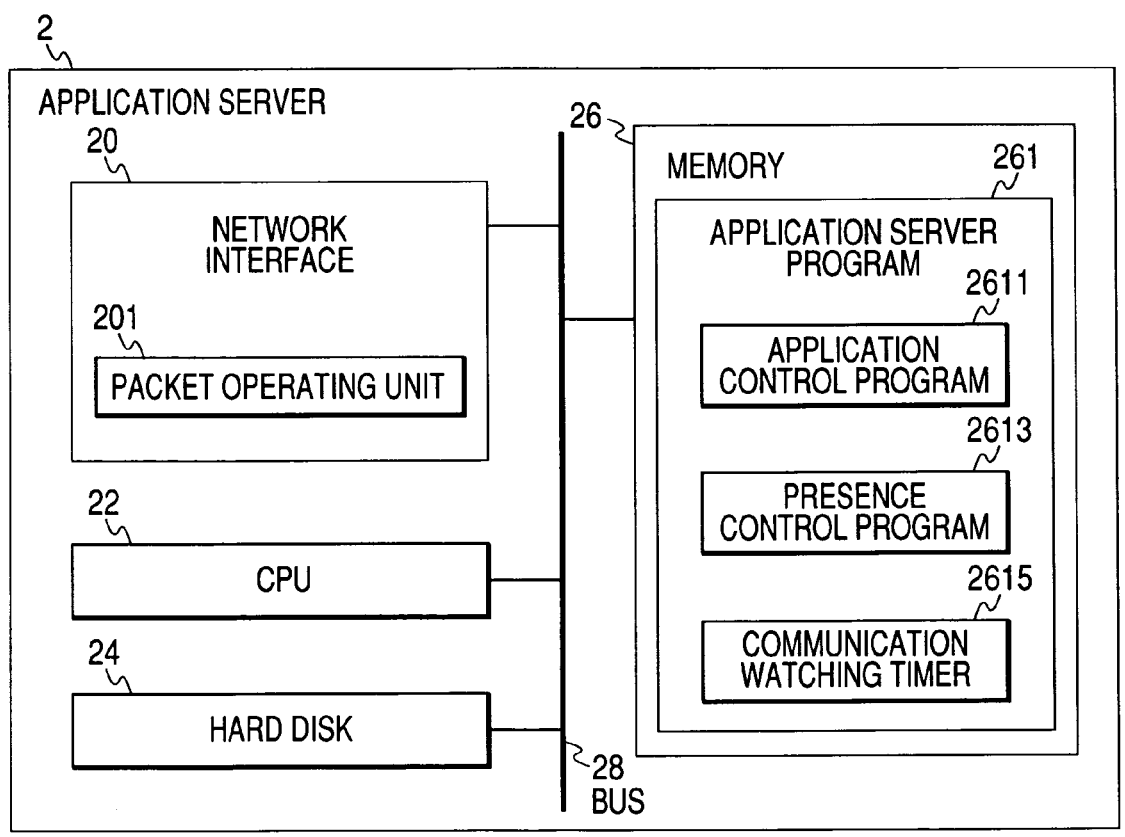
FIG. 3 is a device configuration drawing of an application server.

FIG. 3 is a device configuration drawing of the application server 2. The application server 2 has a basic hardware configuration including a network interface 20, a CPU 22, a hard disk 24, a memory 26, and a bus 28, and communicates with the network 4 through a packet operating unit 201 on the network interface 20. An application server program 261 for controlling services such as TV phones and multi-point TV conferences is placed on the memory 26. The application server program 261 includes an application control program 2611 that controls various services, a presence control program 2613 for sending and receiving presence information to and from the presence server, and a communication watching timer program 2615 that watches communication states, and performs time-out processing as required. As the application control program 2611, programs for protocol processing such as SIP and H.323 that meet different applications are used. However, the device configuration of the application server 2 is not limited to the above-mentioned configuration as long as effects of the present invention are obtained.

Figure 4:
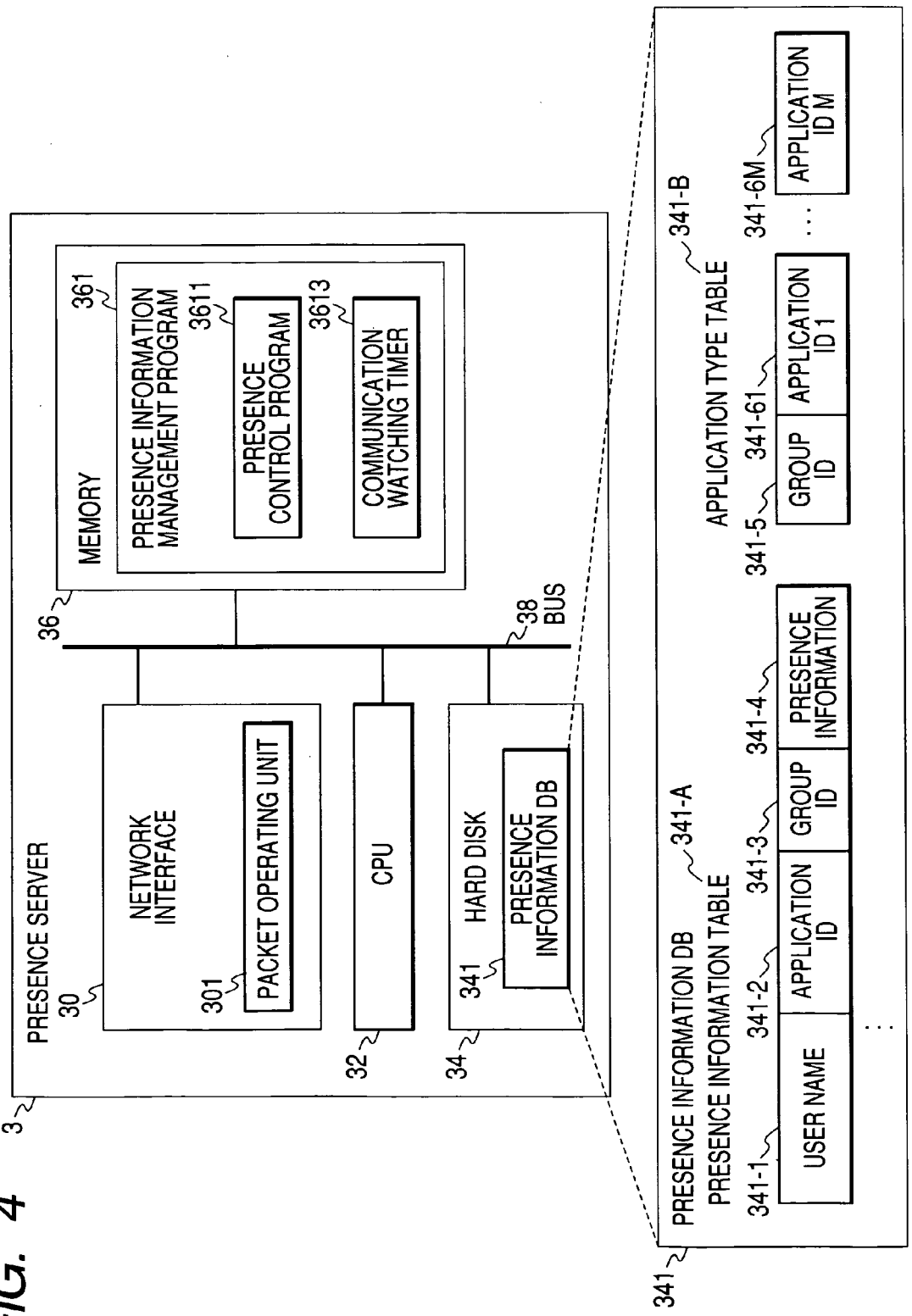
FIG. 4 is a device configuration drawing of a presence server.

FIG. 4 is a device configuration drawing of the presence server 3. The presence server 3 has a basic hardware configuration including a network interface 30, a CPU 32, a hard disk 34, a memory 36, and a bus 38, and communicates the network 4 through a packet operating unit 301 on the network interface 30. A presence information management program 361 for collecting and storing users presence information and sending the information as required is placed on the memory 36. The presence information management program 361 includes a presence control program 3611 that performs the notification and registration of presence information, and a communication watching timer program 3613 that watches communication states and performs time-out processing as required. The presence information is stored in a presence information DB 341 on the hard disk 34. The presence information DB 341 includes at least a presence information table 341-A that manages users' presence information, and an application type table 341-B that manages types of applications. The presence information table includes a user name 341-1, an application ID 341-2 indicating the type of application, a group ID 341-3 indicating the group type of application, and presence information 341-4 of the application. The application type table 341-B manages the types of applications and group information of the applications. A group is identified by a group ID 341-5. If it is assumed that application 1 to application M belong to the same group, the application type table 341-B holds a pair of the IDs of applications (341-61 to 341-6M) belonging to the same group and group ID 341-5. Thereby, applications are classified into groups. However, the device configuration of the presentation server 3 is not limited to the above-mentioned configuration as long as effects of the present invention are obtained.

Figure 5:
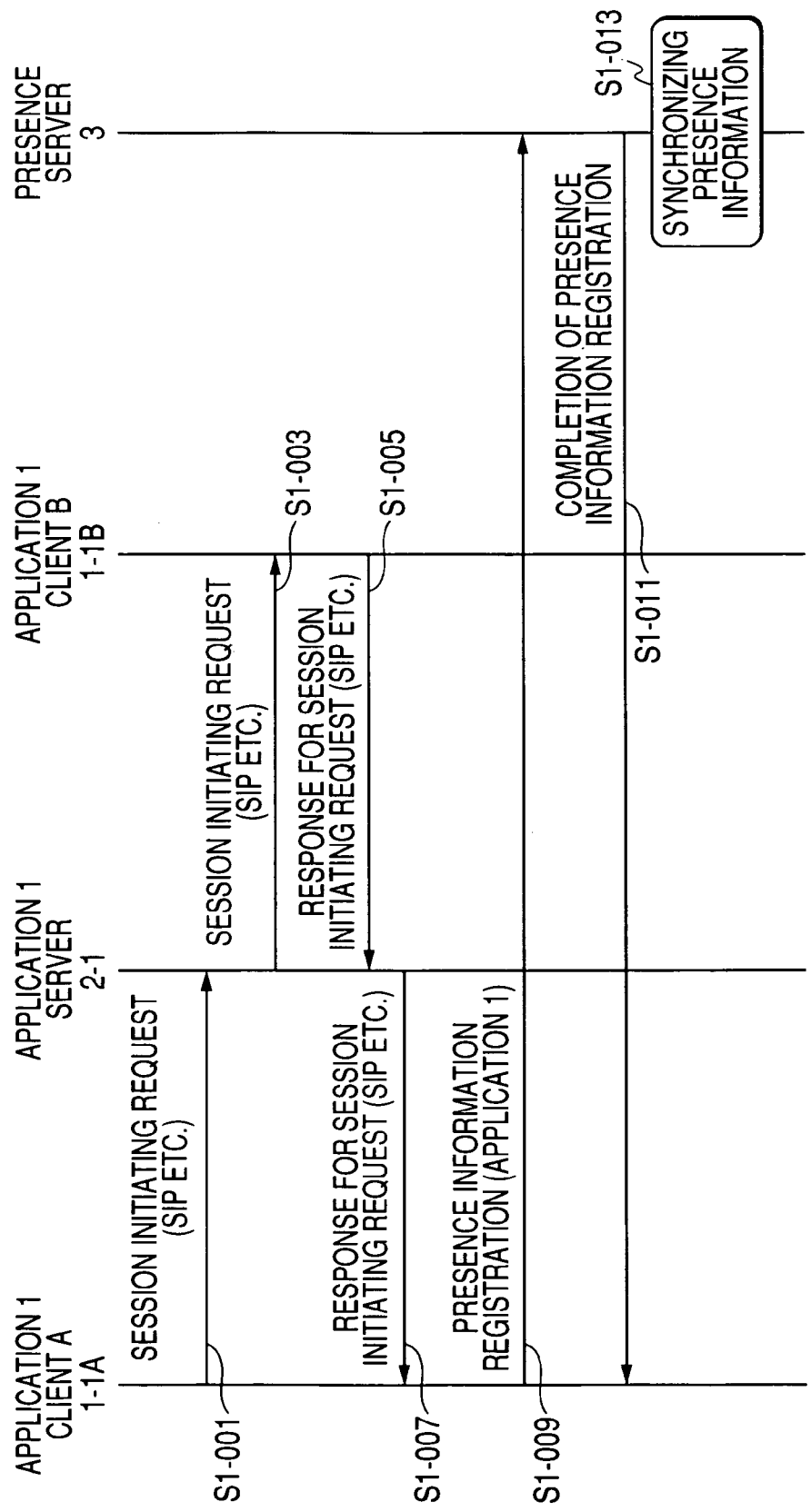
FIG. 5 is a sequence diagram at the start of session.

The following describes the operation of the entire system. FIG. 5 shows a processing sequence when an application 1 client A (1-1A) of a user A establishes a session of an application 1 with an application 1 client B (1-1B) of a user B through the application 1 server 2-1. The application 1 client A (1-1A) sends a session initiating request S1-001 with the user B to the application 1 server 2-1. A protocol such as SIP is used for control of application sessions. The application 1 server 2-1 detects that a destination is user B, and transfers the session initiating request to the application 1 client B (1-1B) (S1-003). On receiving the session initiating request S1-003 from the user A, the user B sends a session initiating response S1-005 for establishing the session to the application 1 server 2-1. On receiving the session initiating response S1-005 from the user B, the application 1 server 2-1 detects that a destination is the user A, and transfers a session initiating response S1-007 to the application 1 client A (1-1A). Through the above-mentioned procedure, the session of application 1 is established between the user A and the user B. The session control is performed by application control programs specific to different protocols such as SIP. After going through the above-mentioned procedure, the application 1 client A (1-1A) registers its own state as "in use" in the presence server 3. The registering presence information is performed in a presence information registration message S1-009. The format of the presence information registration message is shown in PK-01 of FIG. 13. The presence information registration message PK-01 consists of message type (presence information registering) PK-0101, user name PK-0103, application ID PK-0105, and presence information PK-0107. On receiving the presence information registration S1-009, the presence server 3 registers the received presence information in the presence information DB 341. After registering information, the presence server 3 sends a presence information registration completion message S1-011 to the application 1 client A (1-1A) to complete registration processing. The format of the presence information registration completion message S1-011 is shown in PK-03 of FIG. 13. The presence information registration completion message PK-03 includes message type (presence information registration completion) PK-0301, user name PK-0303, application ID PK-0305, and a response code PK-0307. The presence server 3 further synchronizes the presence information of the application registered by the presence information registration S1-009 and presence information of other applications, based on the application type table 341-B (S1-013). To establish synchronization, the presence server 3 acquires an application ID PK-0105 from the presence information registration message PK-01. It uses the acquired application ID PK-0105 to search the application type management table 341-B, and detects the group ID 341-5 of the group to which the application belongs. Finally, the presence server 3 makes registration to the presence information table 341-A by setting "conflicting" in presence information of all applications having IDs other than the application ID PK-0105 within the group for the user. As a result of the above-mentioned processing, other users who refer to the presence information of user A can find that since the application 1 is in use and applications 2 to M are conflicting, neither the application 1 nor the applications 2 to M can be used. Although the above processing applies to the case where the user A starts communication, the same processing is also true for the user B who receives the session initiating request. In the case, after sending the session initiating response S1-005, the user B sends the presence information registration message PK-01 to the presence server 3. The same processing is performed not only at the time of session initiation but also at the time of session termination. In this case, the application 1 client A (1-1A) sends a session terminating request message to the application 1 client B (1-1B) through the application 1 server 2-1, and after receiving a session terminating response, sends a presence information registration message PK-01 with presence information of "idle" to the presence server 3. After receiving the presence information registration message PK-01, the presence server 3 sets "idle" in presence information of all applications belonging to the same group for the user to synchronize presence information. By this processing, other users who view presence information of the user A can find that not only the application 1 but also other applications belonging to the same group are idle. Processing of the user B at the time of session termination conforms to that at the time of session initiation.

After synchronizing presence information, possible processing of the presence server is twofold. First, the application server 2 requests the presence server 3 to make notification of presence information in advance, and the presence server 3 sends the latest information to the application server 2 that requests notification of presence information, for each updating of presence information. Second, each time the application server 2 receives a session initiating request message from the application client 1, the presence server requests the latest presence information from the presence server 3. In both cases, not only the presence information of an application that is requested to update, but also presence information of applications within the same group are updated in synchronization for notification. Thereby, when the application requested to be updated cannot be used, it can be indicated to other users that applications of the same group cannot also be used. Conversely, when the application requested to be updated can be used, it can be indicated to other users that applications of the same group can also be used.

Figure 6:
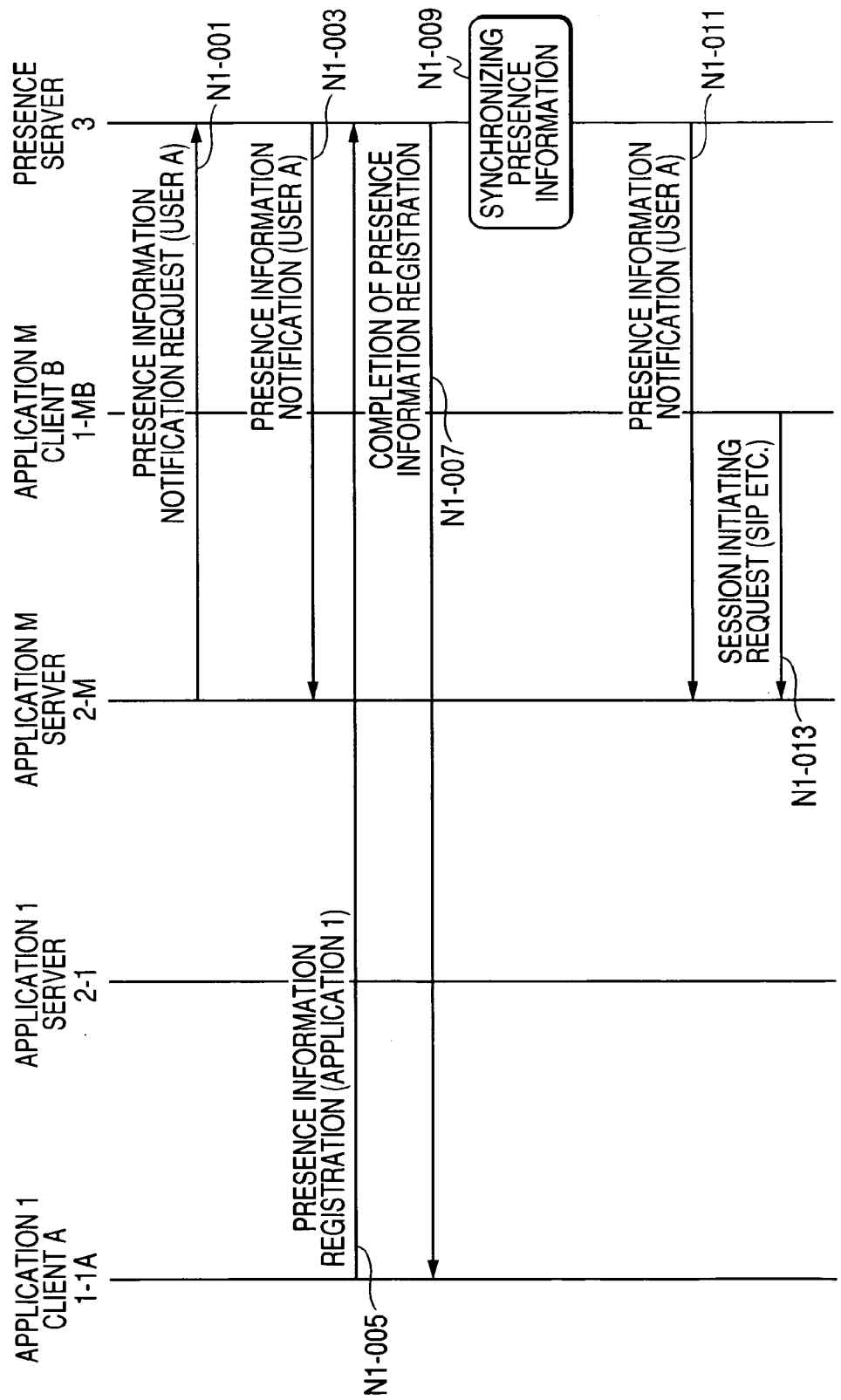
FIG. 6 is a sequence diagram showing an embodiment of presence information notification.

FIG. 6 shows a processing sequence of the former. The application M server 2-M that desires notification of presence information of user A sends a presence information notification request N1-001 to the presence server 3. The format of the presence information notification request N1-001 is shown in PK-05 of FIG. 13. The presence information notification request PK-05 includes message type (presence information notification request) PK-0501, user name PK-0503, and application ID PK-0505. On receiving it, the presence server 3 sends the latest presence information at that time to the requesting source according to a presence information notification message N1-003. The format of the presence information notification message N1-003 is shown in PK-07 of FIG. 13. The presence information notification message PK-07 includes message type (presence information notification) PK-0701, user name PK-0703, application ID PK-0705, and presence information PK-0707. On terminating the session initiating procedure (S1-001 to S1-007) in FIG. 5, the application 1 client A (1-1A) sends a presence information registration message N1-005 to the presence server 3. When the presence server 3 synchronizes presence information (N1-009), the presence information of application M of user A changes from "idle" to "conflicting". The presence server 3 sends a presence information notification message N1-011 according to the request from the application M server 2-M. Since this processing method allows the application M server 2-M to always get the latest presence information, when receiving a session initiating request N1-013 from the application M client B (1-MB), the application M server 2-M does not request presence information of the presence server 3. By this processing, servers or other users who want to know the presence information of the application 1 client A (1-1A) can get the latest presence information for each updating of presence information, simply by once issuing a presence information notification request.

Figure 7:
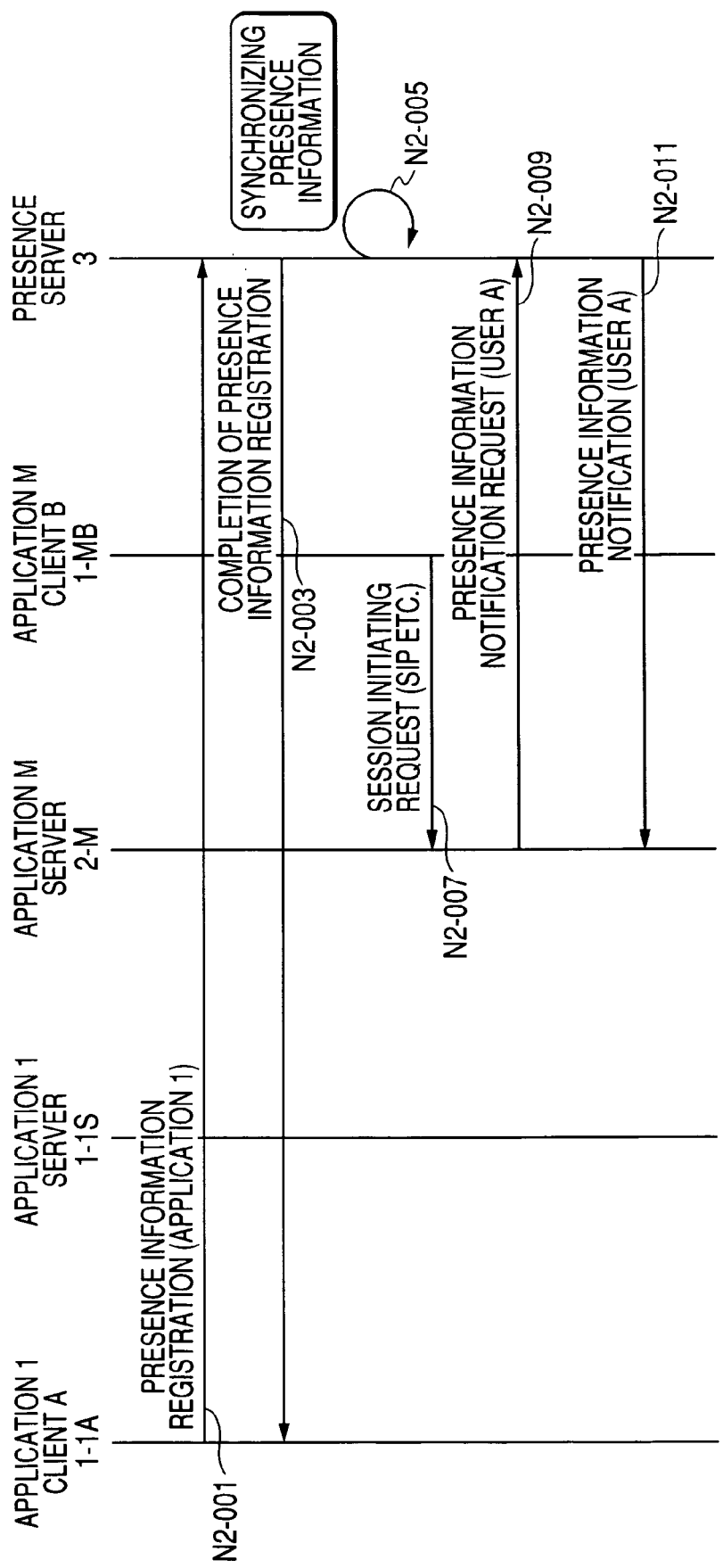
FIG. 7 is a sequence diagram showing another embodiment of presence information notification.

FIG. 7 shows another processing sequence. On terminating the session initiating procedure (S1-001 to S1-007) in FIG. 5, the application 1 client A sends a presence information registration message N2-001 to the presence server 3. On receiving the message, the presence server sends a presence information registration completion message N2-003 to the application 1 client A (1-1A), and then synchronizes presence information (N2-005). By the synchronous processing, the presence information of the application M of the user A is updated. However, since the presence server 3 has no request from the application M server 2-M, the presence information is not sent to the application M server 2-M at this point. Since the application M server 2-M that receives a session M start request N2-007 from user B in this state has no presence information of the user A, it requests the presence information of the user A from the presence server 3. This is achieved by sending a presence information notification request N2-009. On receiving the presence information notification request N2-009, the presence server 3 sends presence information notification N2-011 to the application M server 2-M to send requested presence information. By this processing, servers or other users who want to know the presence information of the application 1 client A (1-1A) can get the latest presence information for each presence information notification request.

The application servers 2 acquire presence information in two timings, as described in the processing sequences of FIGS. 6 and 7. The operation of the system after acquiring presence information is also twofold. First, in a relevant application, when the presence information of a destination user is "in use" or "conflicting", no message is transferred as an error. Second, a message is sent regardless of the presence information of the destination user.

FIG. 8 shows a processing sequence of the former. It is assumed that since the user A is using the application 1, the presence information of the application M belonging to the same group is "conflicting". The application M server 2-M that receives a session start request T1-001 from the application M client B (1-MB) in this state detects that the presence information of destination user (user A) is "conflicting", and sends error notification T1-003 to the application M client B (1-MB) that requests session initiation, and incoming call notification T1-005 to the application M client A (1-MA) of destination. The error notification and incoming call notification are performed by application control programs specific to different protocols such as SIP. By this processing, for a session initiating request to a client (application M client A (1-MA)) that is in communication with other client and cannot accept a session request, since an intervening server interrupts and issues error notification, the communicating client is relieved from error notification processing. Moreover, an increase in useless traffic is avoided.

FIG. 9 shows another processing sequence. It is assumed that the prerequisite of presence information is the same as in FIG. 8. In this processing, since the application server does not take the user's presence information into account, the application M server 2-M that receives a session start request T2-001 from the application M client B (1-MB) transfers it to the application M client A (1-MA) even if the presence information of the user A is conflicting (T2-003), and commits error processing to the client. In this processing, since presence information does not influence application control, the acquisition of presence information by the procedures of FIGS. 6 and 7 may be omitted.

Figure 10:
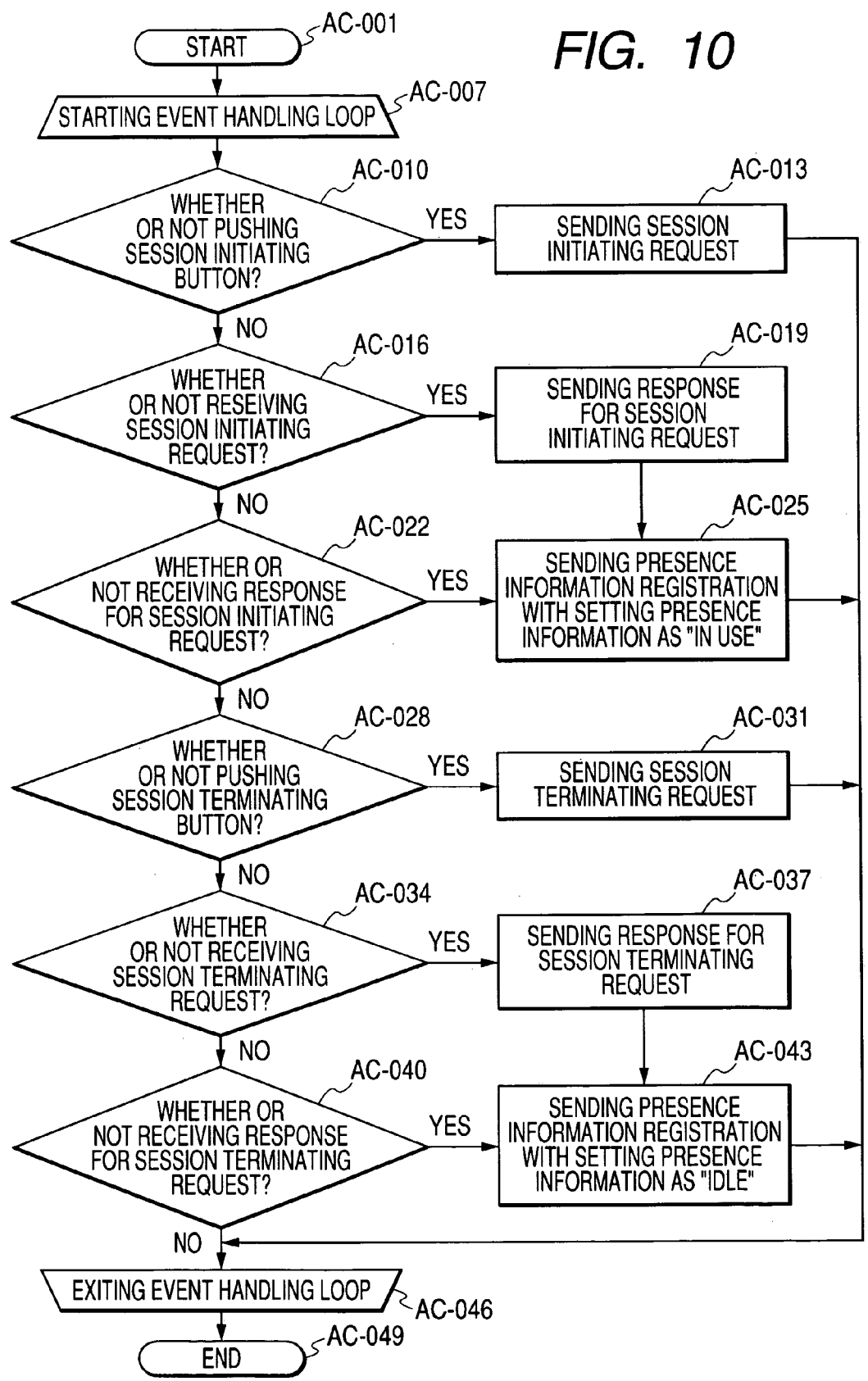
FIG. 10 is a flowchart of an application client.

The following describes the operation of system components with reference to flowcharts. FIG. 10 is a flowchart of the application client 1. The application client 1 starts processing when initiated (AC-001), and enters an event handling loop (AC-007). The term event refers to message reception through a network and a user operation by key pushing or the like. When the user pushes a session initiating button (AC-010), the application client 1 sends a session initiating request message to the application server 2 (AC-013). On receiving the session initiating request message (AC-016), the application client 1 sends a response message for the session initiating request (AC-019), and then registers presence information of "in use" in a presence information registration destination (AC-025). The presence information registration destination is the presence server 3 or an integrated presence client described later 1-P. Also when receiving a response message for the session initiating request (AC-022), the application client 1 registers presence information of "in use" in a presence information registration destination (AC-025). The above is processing at the time of session initiation. When the user pushes a session terminating button (AC-028), the application client 1 sends a session terminating request to the application server 2 (AC-031). On receiving the session terminating request from the application server 2 (AC-034), the application client 1 sends response for the session terminating request (AC-037), and then registers presence information of "idle" in the presence information registration destination (AC-043). Also when receiving response for the session terminating request (AC-040), the application client 1 performs the same processing (AC-043). The event handling loop terminates at the same time when the application client 1 terminates (AC-046), and the application client 1 terminates (AC-049).

Figure 11:
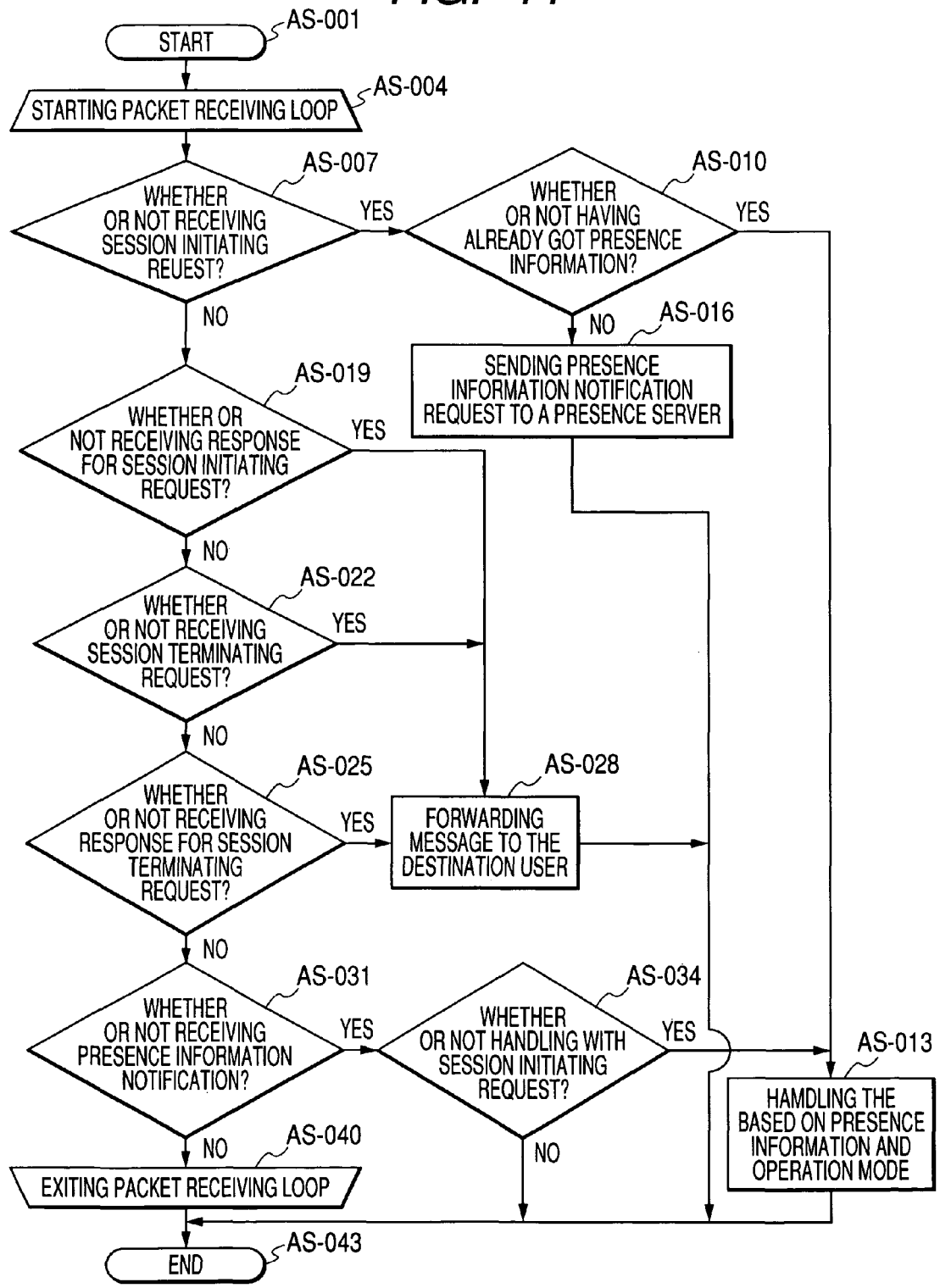
FIG. 11 is a flowchart of an application server.

FIG. 11 is a flowchart of the application server 2. The application server 2 starts processing when initiated (AS-001), and enters a message handling loop (AS-004). On receiving a session initiating request (AS-007), the application server 2 determines whether or not it has already acquired presence information of a destination user (AS-010). When the application server does not use presence information for session control (FIG. 9), this procedure may be omitted. If it has not acquired presence information, it sends a presence information notification request to the presence server 3 (AS-016). If it has already acquired presence information, it performs processing specific to the presence information (AS-013). The message handling here is performed by one of methods shown in FIGS. 8 and 9. When receiving a response message for the session initiating request (AS-019), when receiving a session terminating request message (AS-022), and when receiving a response message for session terminating request (AS-025), the application server 2 transfers these messages to the destination user (AS-028). When receiving presence information notification (AS-031), the application server 2 determines whether it is handling a session initiating request message (AS-034). When the session initiating request message is in process, the presence information notification is information collected actively by the application server 2, and the application server 2 continues message handling using the information (AS-013). The message handling loop terminates at the same time when the application server 2 terminates (AS-040), and the application server 2 terminates (AS-043).

Figure 12:
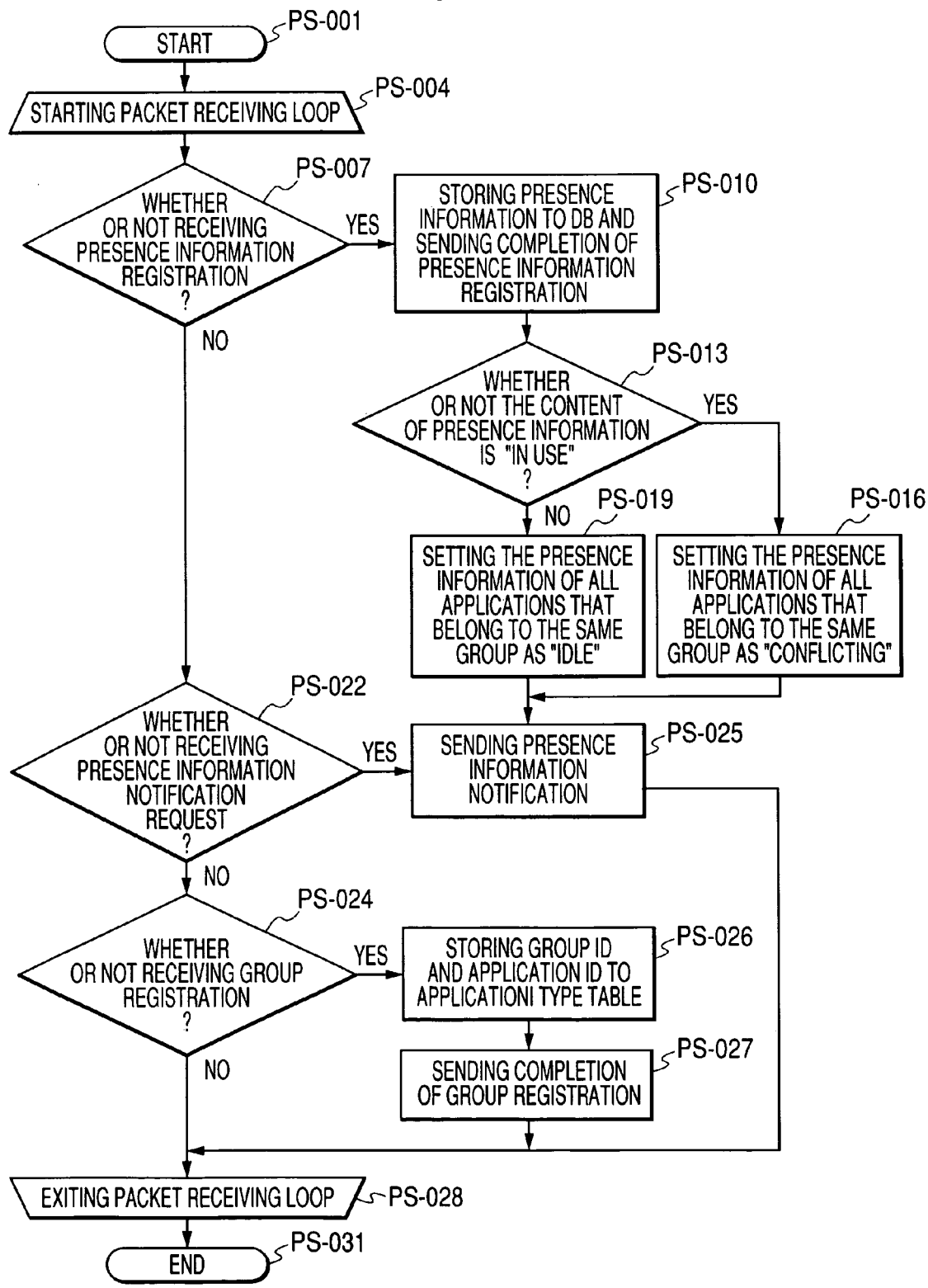
FIG. 12 is a flowchart of a presence server.

FIG. 12 is a flowchart of the presence server 3. The presence server 3 starts processing when initiated (PS-001), and enters a message handling loop (PS-004). When receiving a presence information registration message (PS-007), the presence server 3 registers presence information in the presence information DB 341, and sends a completion message of presence information registration to a registering source (PS-010). After that, it determines the type of the registered presence information (PS-013). When the content of the presence information is "in use", the presence server 3 sets the presence information of all other applications belonging to the same group of the user to "conflicting" (PS-016). If the content of the presence information is not "in use", that is, "idle", the presence server 3 sets the presence information of all applications belonging to the same group of the user to "idle" (PS-019). The above processing is synchronous processing for presence information. Since the updating of presence information occurs after the synchronous processing in PS-016 and PS-019, the presence server 3 sends a presence information notification message to the application server that previously requested the notification of presence information (PS-025). The notification of presence information is made also when it receives a presence information notification request from the application server (PS-022). On receiving the group registration message (PS-024), the presence server 3 registers a pair of a group ID and application IDs in the application type table 341-B (PS-026), and sends a group registration completion message to a group registration sending source (PS-027). Group registration processing will be described later. The message handling loop terminates at the same time as the termination of the presence server 3 (PS-028), and the presence server 3 terminates (PS-031).

Second Embodiment

Figure 14:
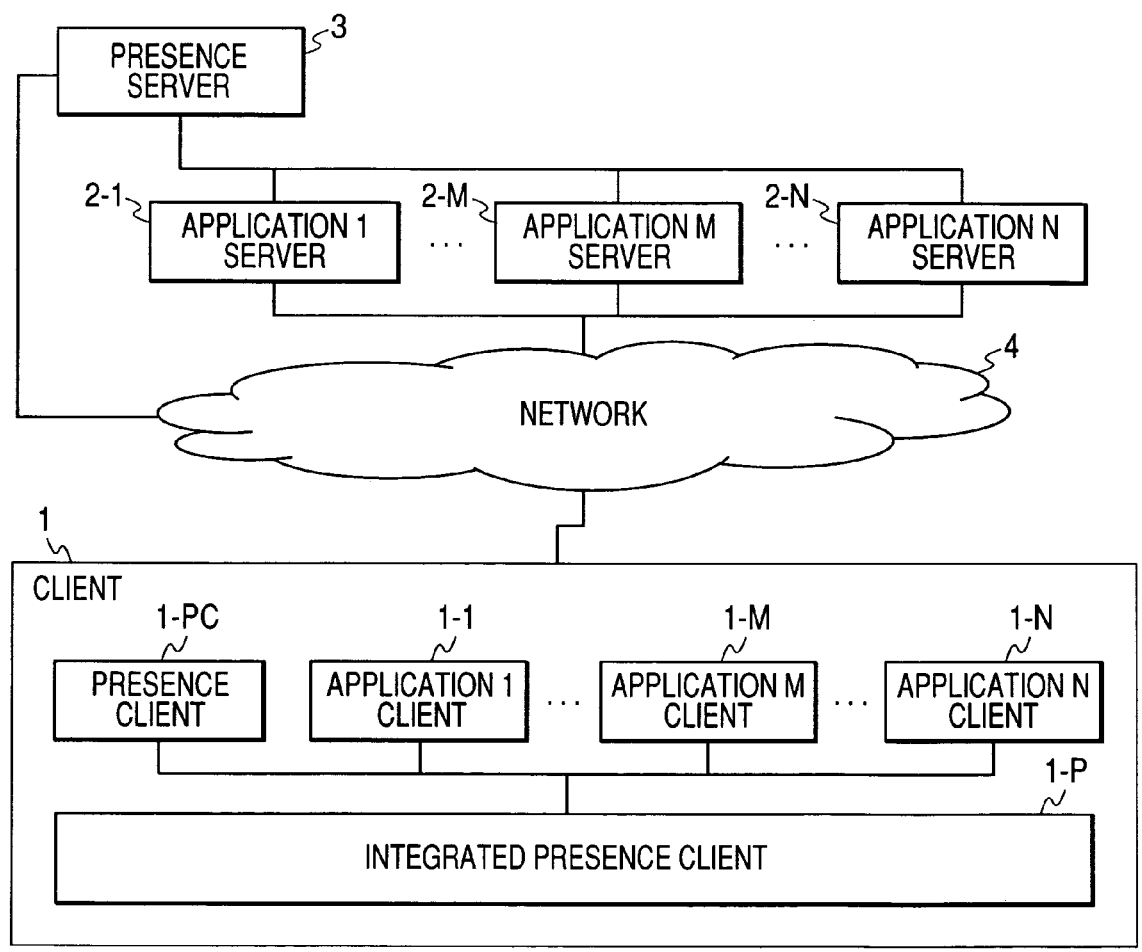
FIG. 14 is a configuration drawing of a system including an integrated presence client.

In the above description, presence information has been synchronized in the presence server. However, the presence information may be synchronized in a client. FIG. 14 is a configuration drawing of a system that is intended to synchronize presence information by a client. The system includes application clients 1-1 to 1-M to 1-N for providing various services to users, presence client 1-PC, application servers 2-1 to 2-M to 2-N corresponding to the application clients, and a presence server 3 that manages users' presence information. The application clients 1-1 to 1-N operate on the same terminal, and an integrated presence client 1-P that integrally manages the presence information of all application clients also operates on the same terminal. These devices are connected with each other through the network 4. In this embodiment, the application clients register presence information in the integrated presence client 1-P, and the integrated presence client 1-P registers synchronized presence information in the presence server 3.

Figure 15:
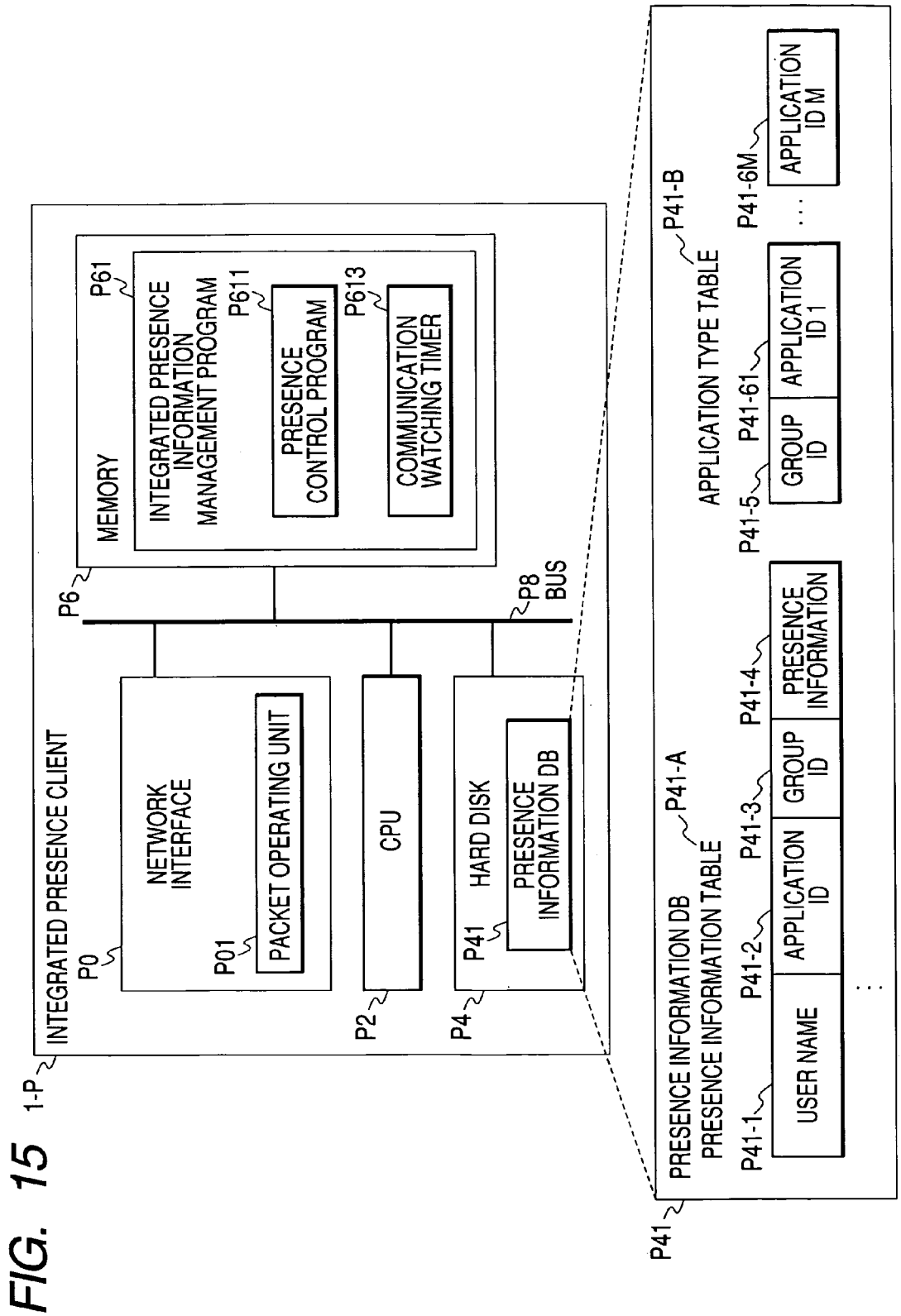
FIG. 15 is a device configuration drawing of an integrated presence client.

FIG. 15 is a device configuration drawing of the integrated presence client 1-P. The integrated presence client 1-P has a basic hardware configuration including network interface P0, a CPU (P2), a hard disk P4, a memory P6, and a bus P8, and communicates with the network 4 through a packet operating unit P01 on a network interface P0. An integrated presence information management program P61 for collecting and storing presence information of the application clients 1-1 to 1-N and sending the information as required is placed on the memory P6. The integrated presence information management program P61 includes a presence control program P611 that performs the notification and registration of presence information, and a communication watching timer program P613 that watches communication states and performs timeout processing as required. The presence information is stored in a presence information DB (P41) on the hard disk P4. The presence information DB (P41) has a presence information table P41-A that manages users' presence information, and an application type table P41-B that manages the types of applications. The presence information table includes a user name P41-1, an application ID P41-2 indicating the type of application, a group ID P41-3 indicating the group type of application, and presence information P41-4 of the application. The application type table P41-B manages the types of applications and group information of the applications. A group is identified by a group ID P41-5. If it is assumed that application 1 to application M belong to the same group, the application type table P41-B holds a pair of IDs of applications (P41-61 to P41-6M) belonging to the same group and a group ID P41-5. Thereby, applications are classified into groups. However, the device configuration of the integrated presence client is not limited to the above-mentioned configuration as long as effects of the present invention are obtained.

Figure 16:
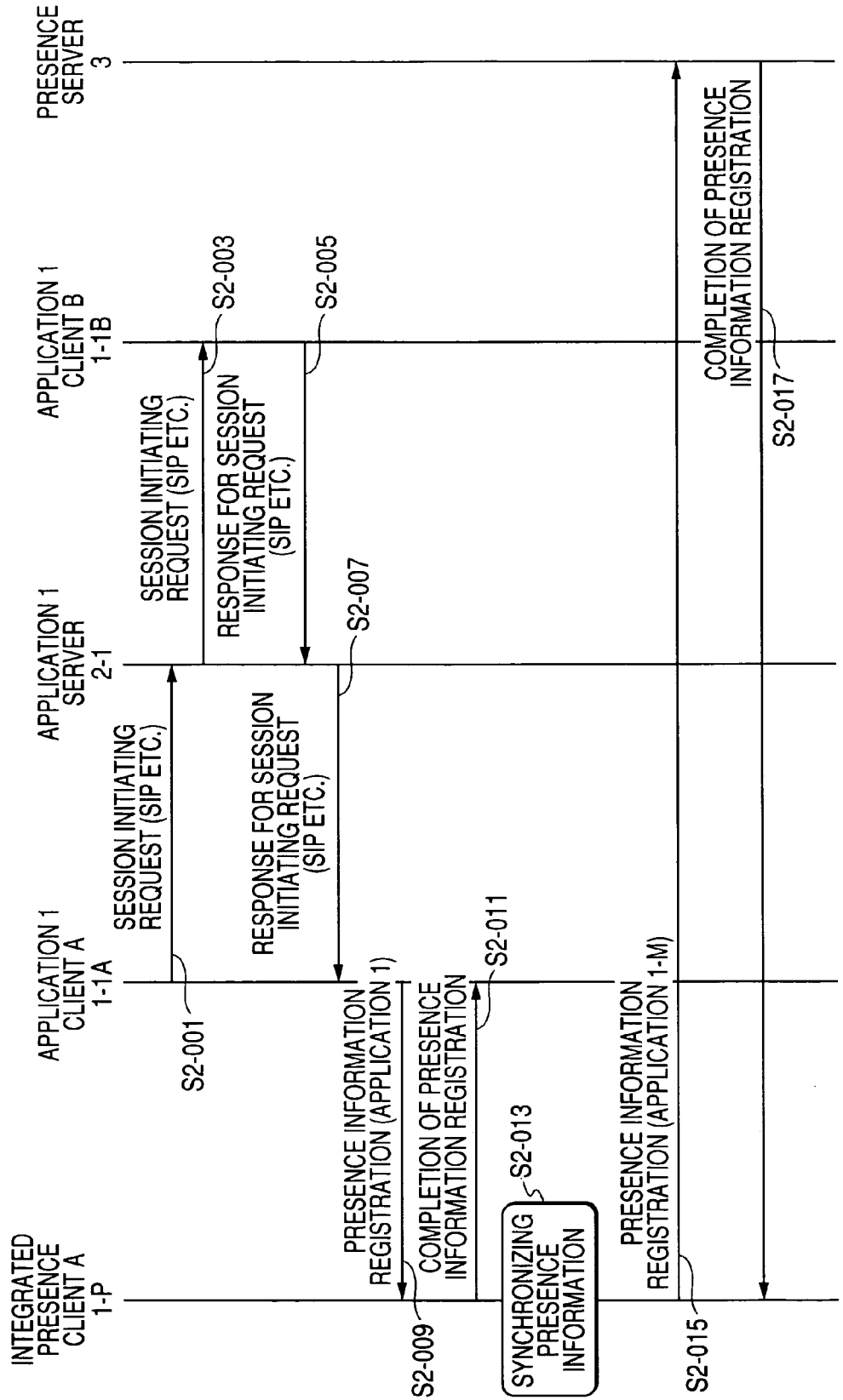
FIG. 16 is a sequence diagram at the start of session including an integrated presence client.

FIG. 16 shows a processing sequence of the entire system. A session establishment procedure is the same as that in FIG. 5. The application 1 client A (1-1A) establishes a session with the application 1 client B (1-1B) through the same procedure as that in FIG. 5 (S2-001 to S2-007). When presence information is synchronized in a client, a registration destination of presence information is the integrated presence client 1-P when viewed from application clients. Accordingly, the application 1 client A (1-1A) sets the state of the application 1 to "in use", and sends a presence information registration message S2-009 to the integrated presence client 1-P. The integrated presence client 1-P registers the received presence information in the presence information DB (P41). After registering the information, the integrated presence client 1-P sends a presence information registration completion message S2-011 to the application 1 client A (1-1A) to complete registration processing. The integrated presence client 1-P further synchronizes presence information based on the application type table P41-B (S2-013). The integrated presence client 1-P acquires application ID PK-0105 in the presence information registration message PK-01. Next, it searches the application type management table P41-B by using the acquired application ID PK-0105, and finds the group ID P41-5 of the group to which the application belongs. After detecting the group ID, the integrated presence client 1-P sets the presence information of all applications having ID other than the application ID PK-0105 within the group to "conflicting" as registration to the presence information table P41-A. Thus, synchronous processing for presence information in the integrated presence client 1-P terminates. The integrated presence client 1-P registers the synchronized presence information of all applications (1 to M) in the presence server by using a presence information registration message S2-015. The presence server 3, without performing synchronous processing for information, sends a presence information registration completion message S2-017 and terminates the processing.

Figure 17:
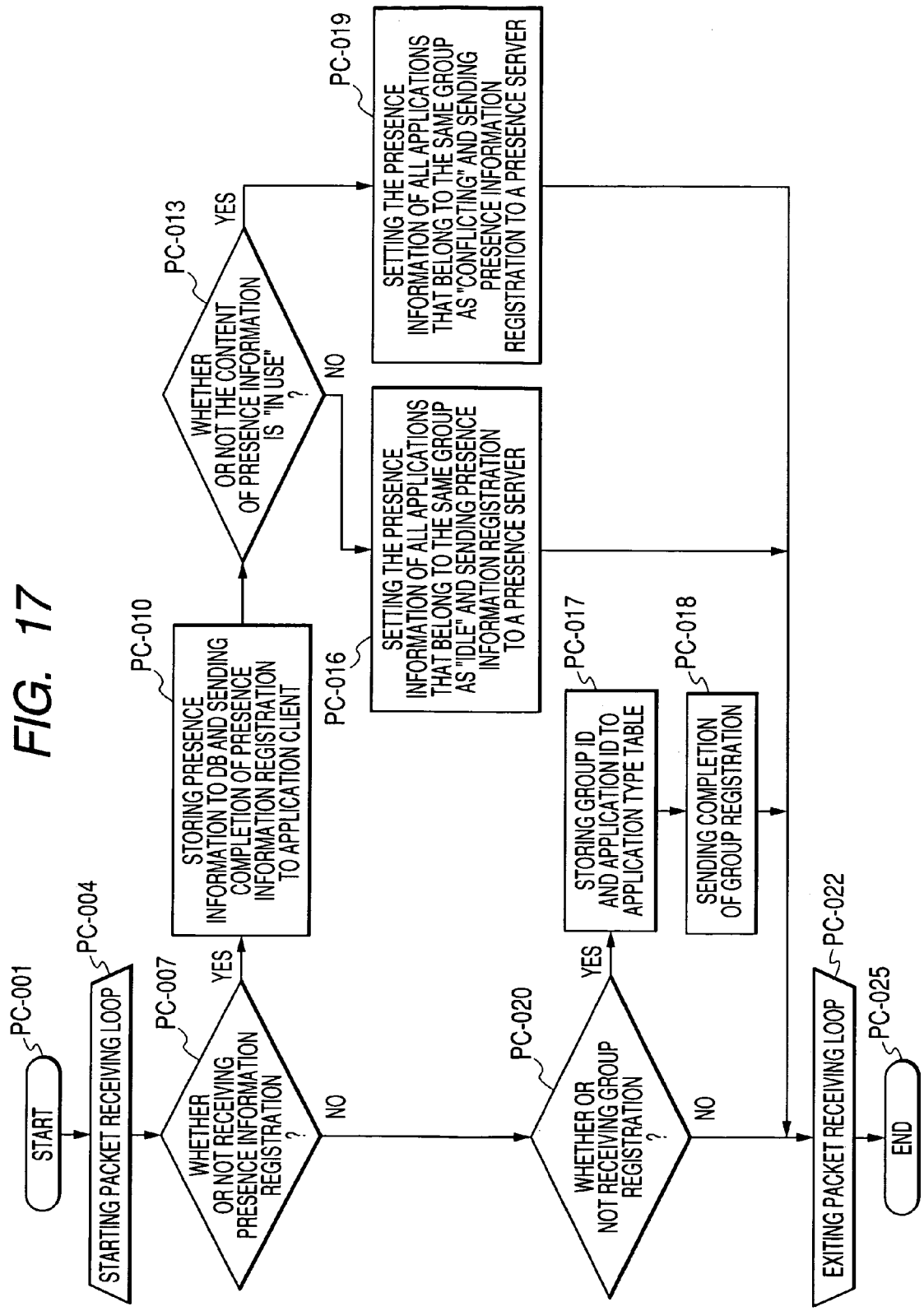
FIG. 17 is a flowchart of an integrated presence client.

FIG. 17 is a flowchart of the integrated presence client 1-P. The integrated presence client 1-P starts processing when initiated (PC-001), and enters a message handling loop (PC-004) When receiving a presence information registration message (PC-007), the integrated presence client 1-P registers presence information in the presence information DB (P41), and then sends completion of presence information registration to an application client of presence registration source (PC-010) After that, the presence server checks the content of registered presence information (PC-013). When the content of the presence information is "in use", the presence server 3 sets the presence information of all other application clients belonging to the same group to "conflicting" (PC-019). If the content of the presence information is not "in use", that is, "idle", the presence server 3 sets the presence information of all application clients belonging to the same group of the user to "idle". On receiving the group registration message (PC-020), the integrated presence client 1-P registers a pair of a group ID and application IDs in the application type table P41-B (PC-017), and sends a group registration completion message to a group registration sending source (PC-018). Group registration processing will be described later. The message handling loop terminates at the same time as the termination of the integrated presence client 1-P (PC-022), and the integrated presence client 1-P terminates (PC-025).

Figure 18:
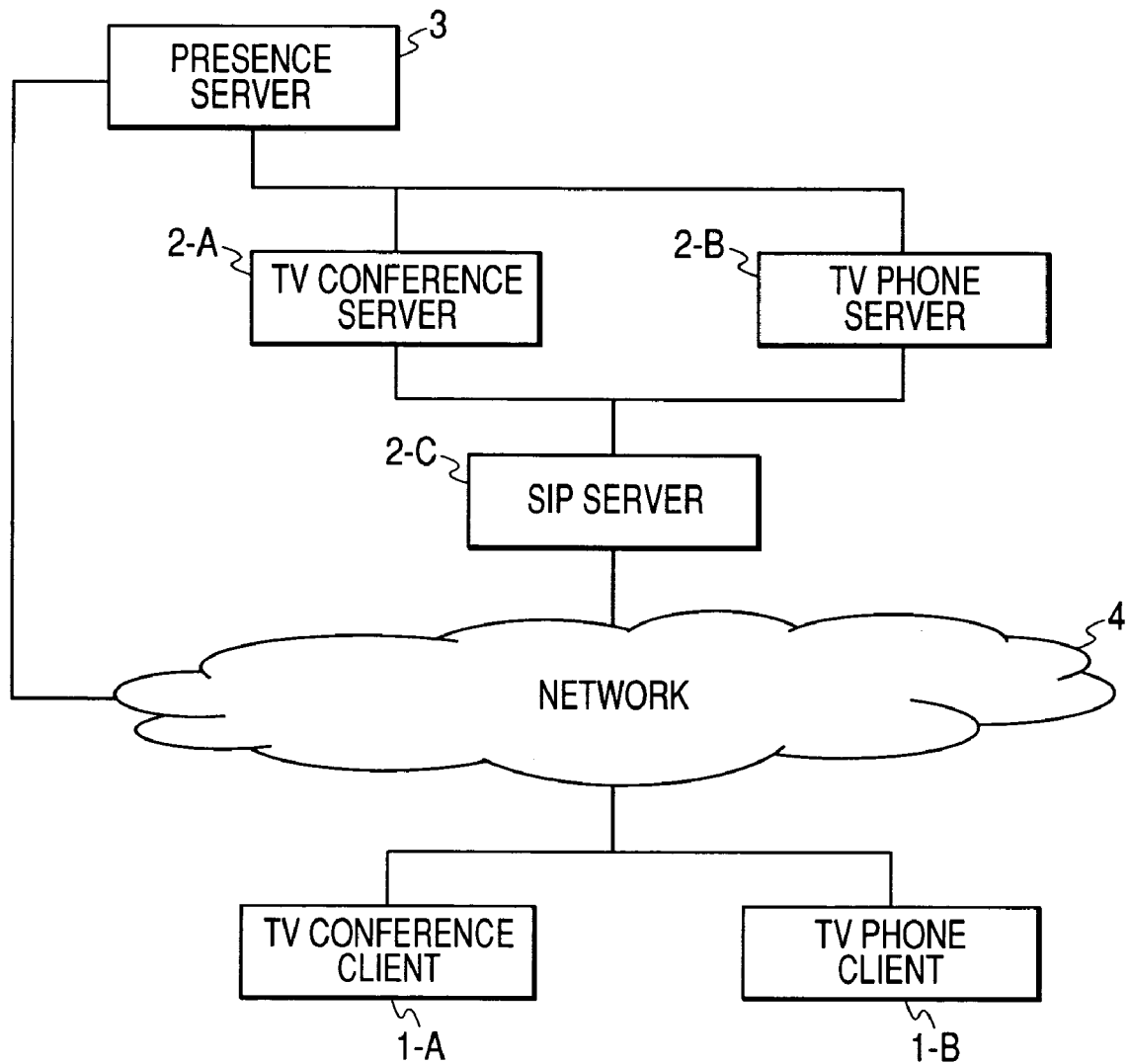
FIG. 18 is a drawing showing the configuration of a system that includes TV conference and TV phone.

The following describes a configuration of a system using actual applications. FIG. 18 is a drawing showing the configuration of a system that includes TV conference and TV phone as applications. The system, which is an embodiment of applications in FIG. 1, includes a TV conference server 2-A, a TV phone server 2-B, and a TV conference client 1-A and a TV phone client 1-B respectively corresponding to them. Assuming that SIP is used as a call control protocol between clients and servers, an SIP server 2-C is included in components as a call control server. Since TV conference and the TV phone share video and voice devices, it is necessary to manage them in a group. These servers may be housed in one cabinet using a blade server, as shown in FIG. 25. However, the configuration of the system is not limited to the above-mentioned configuration as long as effects of the present invention are obtained.

Figure 20:
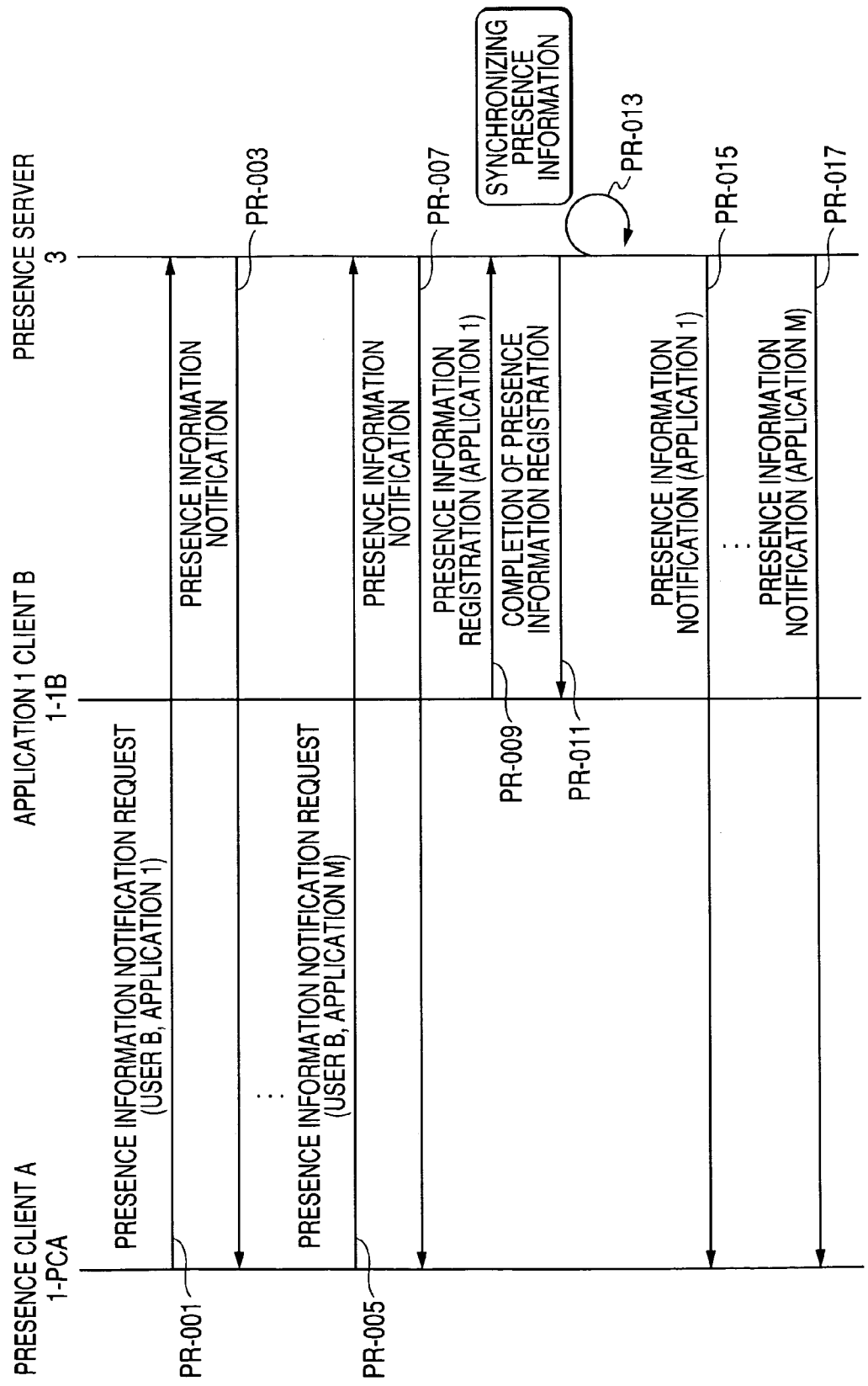
FIG. 20 is a sequence diagram of presence information notification.

The following describes presence information notification and group registration by a presence client, using a processing sequence. FIG. 20 show how presence information is sent to a presence client. To obtain presence information from the presence server 3, it is necessary to previously register a user and an application to obtain presence information about. Assume that user A requests notification of presence information on application 1 to application M of user B. The presence client A (1-PCA) sends presence information notification requests (PR-001, PR-005) to the presence server 3. The presence information notification requests specify both a user and application types, and for all combinations of the user and application types requested for notification, messages are sent one after another. On receiving the presence information notification requests, the presence server 3 sends presence information notification (PR-003, PR-007) for each of the received requests. Subsequently, the presence server 3 sends presence information to the user A for each change of a user B's presence information. When the user B performs operation on the application 1 and the presence information of the application 1 changes, the application 1 client B (1-1B) sends a presence information registration message PR-009 to the presence server 3. After sending a presence information registration completion message PR-011, the presence server 3 synchronizes presence information according to the application type table 341-B (PR-013). Since the user A requests the notification of the presence information of the user B, the presence server 3 sends a presence information notification message (PR-015, PR-017) to the presence client A (1-PCA). At this time, the screen of the presence client A (1-PCA) changes as shown in FIG. 23. GUI-01 is a screen before user B's presence information is updated, and the states of the applications 1 to M are all displayed as "idle". After presence information notification is received from the presence server 3, the screen changes as shown by GUI-03; the application 1 is in use, and the applications 2 to M are conflicting. The above is the process of presence information notification.

Figure 13:
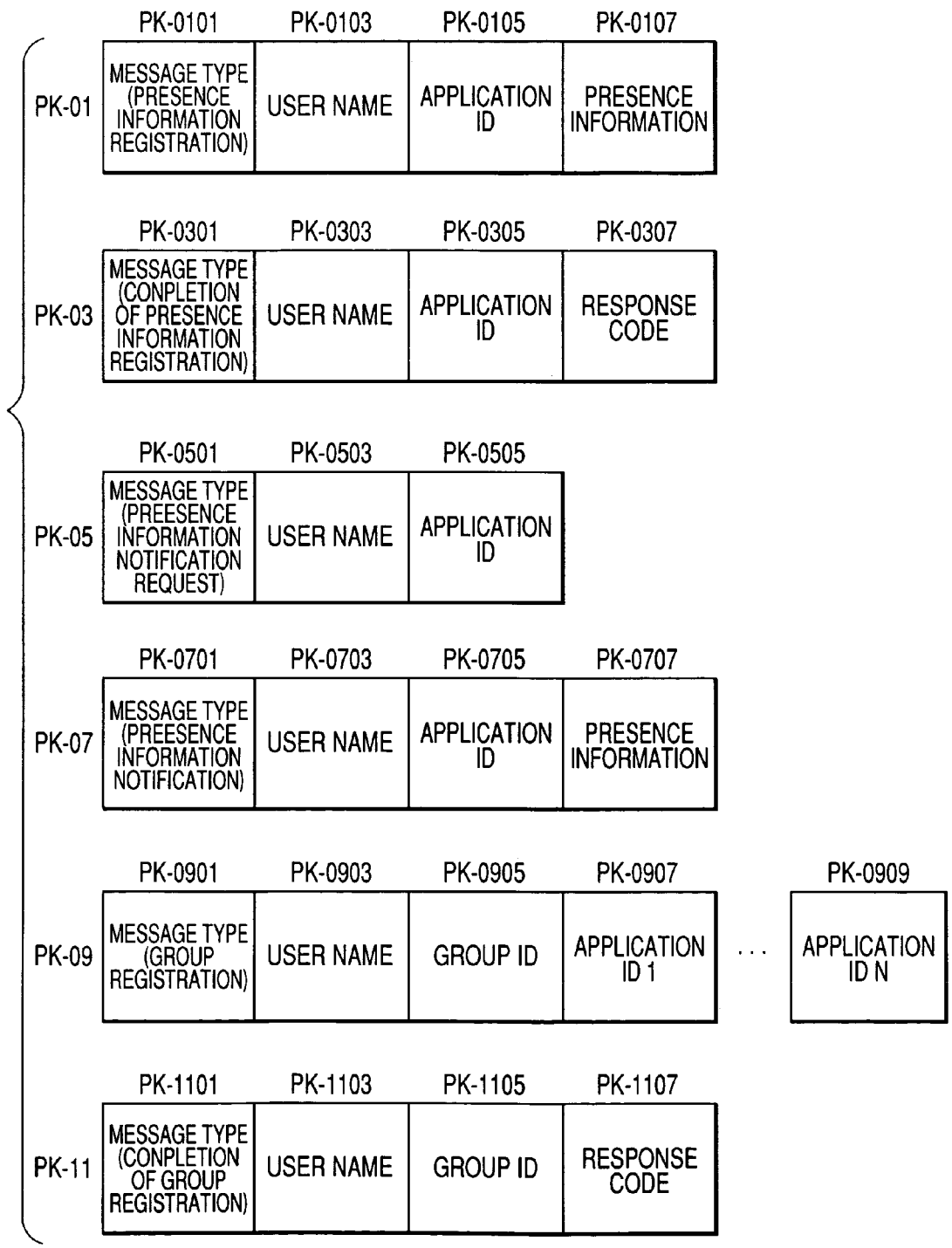
FIG. 13 shows packet formats.
Figure 21:
FIG. 21 is a sequence diagram of group registration.

Applications could be grouped in various patterns. For example, prior grouping is possible because of constraints of devices, and a system administrator might perform settings when initiating the system. However, in some cases, a user himself may want to define groups. In such cases, means by which the user can group applications manually or automatically is required. FIG. 21 shows a processing sequence of group registration. Group registration is performed using GUI shown in FIG. 24 in the presence client 1-PC. The user specifies a group name (ITEM-501) using GUI, and selects applications to be included in the group from the list (ITEM-503 to ITEM-507). When a registration button (ITEM-509) is pressed, a group registration message GR-001 in the sequence of FIG. 21 is sent to the presence server 3. The content of the group registration message is shown in FIG. 13 (PK-09). The group registration message PK-09 includes message type (PK-0901), user name (PK-0903), group ID (PK-0905), and a list of application IDs included in the group (PK-0907 to PK-0909) as information. For the group registration message GR-001, the presence server 3 sends a group registration completion message GR-003 to the presence client 1-PC. FIG. 13 shows the content of the group registration completion message (PK-11). The group registration completion message PK-11 includes message type (PK-1101), user name (PK-1103), group ID (PK-1105), and response code (PK-1107) as information. Thus, group registration terminates. When an integrated presence client exists, group registration is performed for the integrated presence client.

Figure 22:
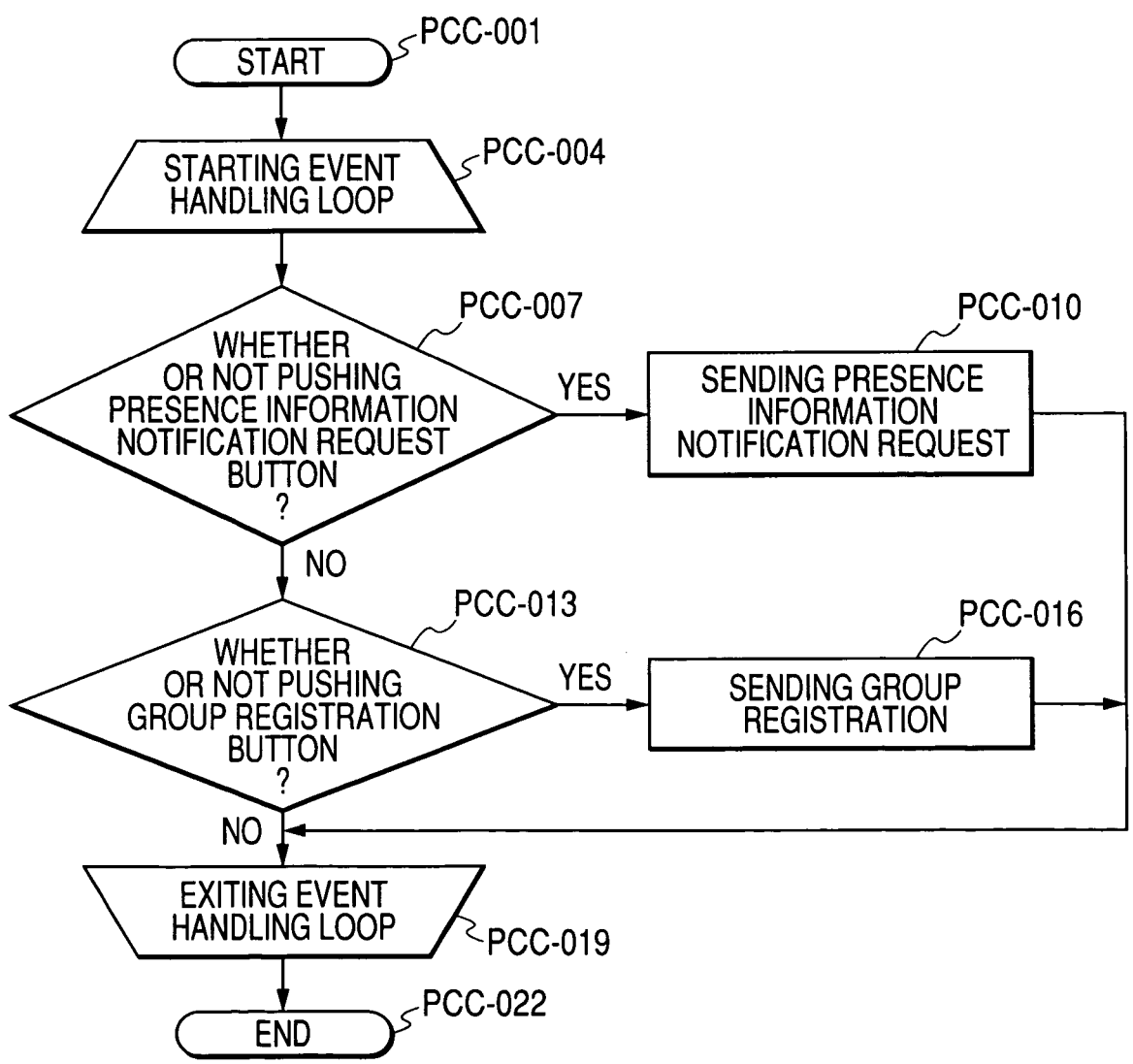
FIG. 22 is a flowchart of a presence client.

FIG. 22 shows a flowchart of the presence client 1-PC for realizing a presence information notification request function and a group registration function. The presence client 1-PC starts processing when initiated (PCC-001), and enters an event handling loop (PCC-004). The term event refers to message reception through a network and a user operation by key pushing or the like. When the user presses a presence information notification request button (PCC-007), the presence client 1-PC sends the presence information notification request message to any of the presence server 3 and the integrated presence client 1-P (PCC-010). A sending destination depends on system configuration. When the user presses the group registration button (PCC-013), the presence client sends the group registration message to any of the presence server 3 and the integrated presence client 1-P (PCC-016). The event processing loop terminates at the same time when the presence client 1-PC terminates (PCC-019), and the presence client 1-PC terminates (PCC-022). The presence client 1-PC and the integrated presence client 1-P may be implemented as one application.

As has been described above, the integrated presence management system of the present invention groups applications to integrally manage presence information of applications belonging to the same group, it can apply to a real-time communication system or the like in which one user uses plural applications such as TV conference and TV phone at the same time.

What is claimed is:

1. An integrated presence management system comprising:
   a plurality of application servers each including an input-output interface, a CPU, and a memory storing application programs;
   a terminal including an input-output interface, a CPU, and a memory storing a plurality of applications respectively corresponding to the plurality of application servers; and
   a presence server including an input-output interface, a CPU, and a memory storing presence information of the terminal on said plurality of applications, where said plurality of application are grouped,
   wherein, the presence server manages said presence information of the terminal on said plurality of applications linked with a group information in which said plurality of applications belongs, and when receiving presence information registration of the terminal on one application of the plurality of applications from the terminal, the presence server identifies group information in which said one application belongs, and synchronizes presence information of the terminal on at least an another application of said plurality of application linked to the identified group information with that of said one application,
   wherein the memory of the presence server stores an application type table that stores application IDs indicating the respective types of the plurality of applications and a group ID indicating the group of the plurality of applications, and a presence information table that stores presence information on each application, wherein a plurality of applications belonging to the same group are a plurality of applications that cannot be used at the same time.

2. The integrated presence management system according to claim 1, when the presence information of the terminal on the one application indicates "in use", updating presence information of the terminal on the other applications belonging to the same group to "conflicting".

3. The integrated presence management system according to claim 1, when the presence information of the terminal on the one application indicates "idle", updating presence information of the terminal on the other applications belonging to the same group to "idle".

4. The integrated presence management system according to claim 1, when registering the presence information from the terminal, sending the ID of the one application from the terminal to the presence server.

5. The integrated presence management system according to claim 1, when sending presence information from the presence server to other terminals or other servers, sending the ID of an application from the presence server to the other terminals or other servers.

6. The integrated presence management system comprising:

a plurality of application servers each including an input-output interface, a CPU, and a memory storing application programs;

a terminal including an input-output interface, a CPU, and a memory storing a plurality of applications respectively corresponding to the plurality of application servers; and a presence server grouping said plurality of applications including an input-output interface, a CPU, and a memory storing presence information of the terminal on said plurality of applications and an application type table that stores application IDs indicating the respective types of the plurality of applications and a group ID indicating the group of the plurality of applications, wherein, the memory of the terminal has an integrated presence client for managing said presence information of the terminal on said plurality of applications linked with a group information, and when the presence information on the one application is registered, the integrated presence client synchronously registers presence information on other applications of said plurality of applications linked to identified group information by said presence server with that of the one application in the presence server, wherein a plurality of applications belonging to the same group are a plurality of applications that cannot be used at the same time.

* * * * *